(12) United States Patent
Watson

(10) Patent No.: US 12,578,028 B2
(45) Date of Patent: Mar. 17, 2026

(54) SELF-REGULATING CONTROL VALVE

(71) Applicant: Dallas Chism Watson, Guthrie, OK (US)

(72) Inventor: Dallas Chism Watson, Guthrie, OK (US)

( * ) Notice: Subject to any disclaimer, the term of this patent is extended or adjusted under 35 U.S.C. 154(b) by 0 days.

(21) Appl. No.: 19/249,013

(22) Filed: Jun. 25, 2025

(65) Prior Publication Data

US 2025/0389341 A1     Dec. 25, 2025

Related U.S. Application Data

(60) Provisional application No. 63/663,789, filed on Jun. 25, 2024.

(51) Int. Cl.
    *F16K 17/20*        (2006.01)
    *F16K 31/122*       (2006.01)

(52) U.S. Cl.
    CPC .......... *F16K 17/20* (2013.01); *F16K 31/1221* (2013.01)

(58) Field of Classification Search
    CPC .......... F16K 17/20; F16K 17/22; F16K 17/30; F16K 31/1221; F16K 17/04; F16K 17/0486; F16K 17/48; F16K 17/24; F16K 17/32; F16K 17/36; E21B 43/12; G05D 16/107; Y10T 137/7728
    USPC ........................................................ 251/282
    See application file for complete search history.

(56) References Cited

U.S. PATENT DOCUMENTS

| | | | | | |
|---|---|---|---|---|---|
| 2,227,297 | A | * | 12/1940 | Coy | .................... G05D 16/0655 137/462 |
| 2,314,113 | A | * | 3/1943 | Watson | .................. E21B 43/122 137/624.17 |
| 2,687,144 | A | * | 8/1954 | Rafferty | ............... G05D 16/101 137/505.22 |
| 3,716,074 | A | * | 2/1973 | Peters | ................. F16K 11/0716 137/487 |
| 5,620,017 | A | * | 4/1997 | Yamada | ................. A62C 35/68 137/489.5 |

(Continued)

*Primary Examiner* — Daphne M Barry
(74) *Attorney, Agent, or Firm* — Hall Estill Law Firm

(57)                ABSTRACT

A self-regulating control valve including a valve mechanism for controlling the flow of fluid from a high-pressure fluid supply to a low-pressure flow line, the low-pressure flow line having a max pressure for fluid flowing therethrough, a cylinder with a piston head therein and a spring acting to force the piston head in a close direction, the spring having a pressure force. The valve also includes a sample fluid line directing a sample fluid from the low-pressure flow line to a top side of the cylinder, the supply pressure fluid acting on the piston head in an open direction for the valve mechanism and the sample fluid acting on the piston head in a close direction for the valve mechanism. The max pressure for the fluid through the low-pressure flow line is approximately equal to the pressure of the supply pressure fluid and the pressure force of the spring. A method of including the steps of feeding a self-regulating control valve a supply pressure fluid at a desired pressure in a direction to open a valve mechanism and feeding the self-regulating control valve a sample fluid from the low-pressure flow line in a direction to close the valve mechanism. The method also includes the step of closing the valve mechanism of the self-regulating control valve when pressure of fluid in the low-pressure fluid line reaches a max pressure.

26 Claims, 7 Drawing Sheets

(56) References Cited

U.S. PATENT DOCUMENTS

| | | | | |
|---|---|---|---|---|
| 9,400,060 | B2 * | 7/2016 | Garvey | G05D 16/166 |
| 2019/0168039 | A1 * | 6/2019 | Rowe | G05D 16/166 |
| 2020/0347957 | A1 * | 11/2020 | Mears | F16K 31/1221 |

* cited by examiner

SELF-REGULATING CONTROL VALVE

CROSS-REFERENCE TO RELATED APPLICATIONS

The present application is a conversion of U.S. Provisional Application having U.S. Ser. No. 63/663,789, filed Jun. 25, 2024, which claims the benefit under 35 U.S.C. 119(e). The disclosure of which is hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Invention

The present disclosure relates to a self-regulating control valve to prevent an over pressure occurrence in a low-pressure flow line that receives fluid from a high-pressure flow line.

2. Description of the Related Art

Typically, a pressure control valve that is used to regulate flow of fluids from a high-pressure line to a low-pressure line requires the use of an external pilot to open and/or close the pressure control valve.

Accordingly, there is a need for a valve that can be set up with a pressurized fluid system that can self-regulate the flow of fluid from a high pressure zone to a low pressure zone.

SUMMARY OF THE DISCLOSURE

The present disclosure is directed to self-regulating control valve. The valve includes a valve mechanism for controlling the flow of fluid from a high-pressure fluid supply to a low-pressure flow line, the low-pressure flow line having a max pressure for fluid flowing therethrough, a cylinder with a piston head therein and a spring acting to force the piston head in a close direction, the spring having a pressure force. The valve also includes a sample fluid line directing a sample fluid from the low-pressure flow line to a top side of the cylinder, the supply pressure fluid acting on the piston head in an open direction for the valve mechanism and the sample fluid acting on the piston head in a close direction for the valve mechanism. The max pressure for the fluid through the low-pressure flow line is approximately equal to the pressure of the supply pressure fluid and the pressure force of the spring.

The present disclosure is also directed to a method of regulating the pressure of a low-pressure fluid line. The method includes the steps of feeding a self-regulating control valve a supply pressure fluid at a desired pressure in a direction to open a valve mechanism and feeding the self-regulating control valve a sample fluid from the low-pressure flow line in a direction to close the valve mechanism. The method also includes the step of closing the valve mechanism of the self-regulating control valve when pressure of fluid in the low-pressure fluid line reaches a max pressure.

DETAILED DESCRIPTION OF THE DISCLOSURE

Figure 1:
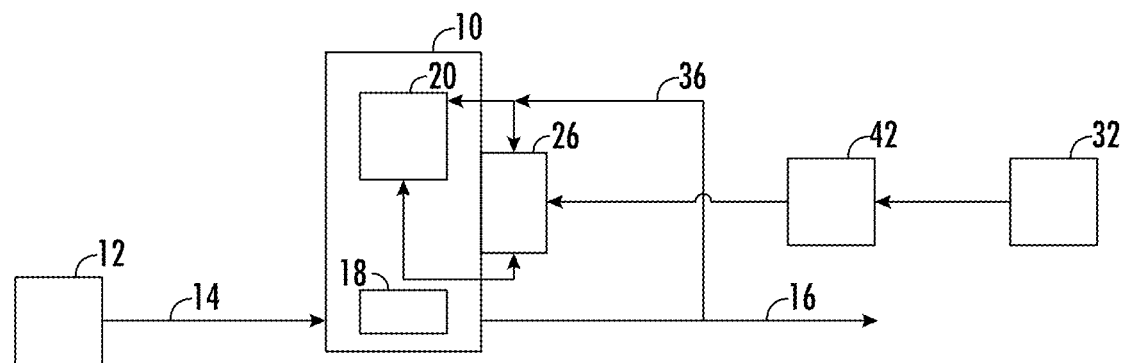
FIG. 1 is a schematic view of one embodiment of a system using a self-regulating control valve constructed in accordance with the present disclosure.
Figure 2:
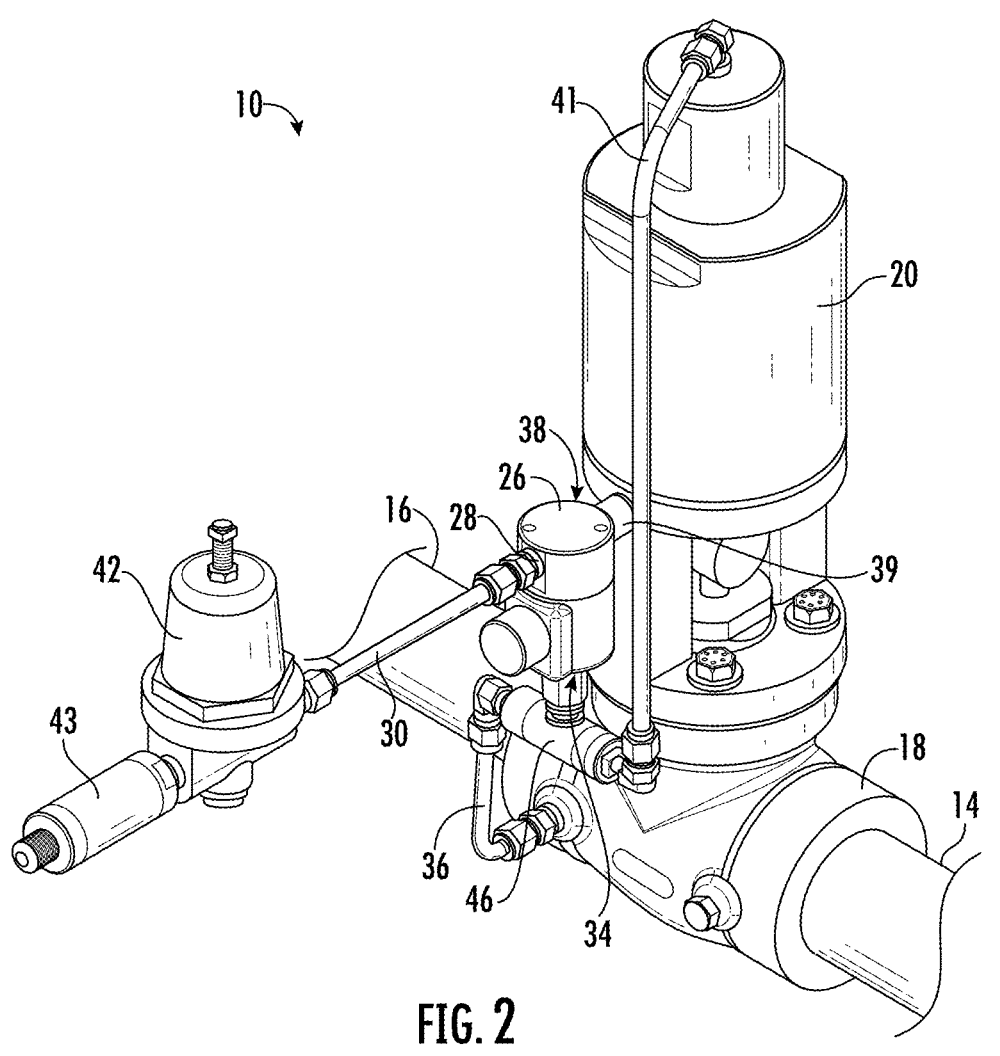
FIG. 2 is a perspective view of a self-regulating control valve constructed in accordance with the present disclosure.

Referring now to FIGS. 1-3C, the present disclosure is related to a self-regulating control valve 10 for use with a pressurized system 12 that has a high-pressure fluid supply 14 upstream from the self-regulating control valve 10 and a low-pressure flow line 16 downstream from the self-regulating control valve 10. The present disclosure is also directed to a method of controlling and/or maintaining the pressure of the fluid in the low-pressure flow line 16 to prevent the pressure of the fluid in the low-pressure flow line 16 from going above a certain pressure threshold. The low-pressure flow line 16 can have a max pressure that it is desired for the fluids flowing therethrough, which can be significantly lower than the pressure of the high-pressure fluid supply 14. The low-pressure line 16 can correspond and direct the fluid to any vessel, container, system and the like that a max fluid pressure is desired for. In most situations, after some time the self-regulating control valve 10 will be able to equalize the pressure between the high-pressure fluid supply 14 and the low-pressure flow line 16. When equalization occurs, the self-regulating control valve 10 can be open and fluids can flow from the high-pressure fluid supply 14 to the low-pressure flow line 16 without fear of damaging the pressurized system 12. In one exemplary embodiment, the high-pressure fluid supply 14 could be the production fluids from production tubing from and oil and gas well. It should be understood and appreciated that the term fluid used herein can refer to a gas or liquid.

The self-regulating control valve 10 can include a valve mechanism 18 (such as a ball and seat valve), a cylinder 20 with a piston head 21 disposed therein, a valve stem 22 connecting the valve mechanism 18 (e.g., the ball of the ball and seat valve) to the piston head 21 in the cylinder 20 and a spring 24 biasing the valve stem 22 to apply some desired closing pressure on the valve mechanism 18. The valve mechanism 18 can be opened or closed to control the flow of fluid from the high-pressure fluid supply 14 to the low-pressure flow line 16. The self-regulating control valve 10 also includes a latch valve 26 to control the flow of various fluids to properly operate the self-regulating control valve 10. As an exemplary embodiment, the latch valve 26 could be a 3/2 solenoid valve.

The latch valve 26 can include a first inlet 28 for receiving a supply pressure fluid 30 to contribute to operation of the self-regulating control valve 10. The supply pressure fluid 30 can be provided by regulating a pressurized gas source 32 to a desired supply pressure for operation of the self-regulating control valve 10. In an exemplary embodiment, the pressurized gas source for the pressurized gas can be the gas from the casing of an oil and gas well. In addition to the first inlet 28, the latch valve 26 can include a second inlet 34 for receiving a sample fluid via a sample fluid line 36 directed from the flow line 16 and an outlet 38 for directing the supply pressure fluid to a bottom side 40 of the cylinder via flow line 39. The bottom side 40 of the cylinder 20 is the side that opens the valve mechanism 18 when the requisite amount of force is applied.

The self-regulating control valve 10 described herein is unique because of its ability to work with fluids at very high pressures. For example, if spring 24 was rated to have a 40 pound pressure force, the low-pressure flow line 16 can be rated for fluids at maximum pressures of about 40 psi to about 1960 psi. The corresponding pressure of the supply pressure fluid 30 would be about 80 psi to about 2000 psi. In another embodiment, the low-pressure flow line 16 can be rated for fluids at pressures from about 100 psi to about 1960 psi. In a further embodiment, the low-pressure flow line 16 can be rated for fluids at pressures from about 250 psi to about 1960 psi. In yet another embodiment, the low-pressure flow line 16 can be rated for fluids at pressures from about 500 psi to about 1960 psi. In an even further embodiment, the low-pressure flow line 16 can be rated for fluids at pressures from about 1000 psi to about 1960 psi. The corresponding pressure of the supply pressure fluid 30 is a function of the pressure force of the spring 24 used and the desired maximum pressure of the low-pressure flow line 16.

When the latch valve 26 is in an open position, the supply pressure fluid maintained at a desired supply pressure by a regulator 42 is fed to the first inlet 28 and exits the outlet 38 and is directed to the bottom side 40 of the cylinder 20 via the flow line 39. A check valve 43 could be incorporated upstream from the regulator 42 to prevent fluid from the self-regulating control valve 10 from flowing back towards the pressurized gas source 32. The sample fluid from the flow line 16 is directed to the second inlet 34 of the latch valve 26 and a top side 44 of the cylinder 20. Therefore, when the latch valve 26 is in the open position the supply pressure fluid is acting on the underside of the piston head 21 in the cylinder 20 in a valve open direction for the valve mechanism 18. At the same time, the sample fluid from the flow line 16 (i.e., has the same pressure as the flow line fluid) is directed to the top side 44 of the piston head 21 in the cylinder 20, via flow line 41, in a valve close direction for the valve mechanism 18. The spring 24 is also acting in the valve close direction on the valve mechanism 18. To close the valve mechanism 18 and protect the pressurized system 12 downstream from the self-regulating control valve 10, the force of the spring 24 and the pressure of the sample fluid from the flow line 16 has to be greater than the pressure of the supply pressure fluid 30. The pressure of the supply pressure fluid 30 can be set to be roughly equal to the force of the spring 24 and the max pressure desirable for the low-pressure flow line 16. When the pressure of the fluid in the low-pressure flow line 16 gets above the max pressure desirable (the pressure of the sample fluid is also above the max pressure), the combination of the spring pressure and the sample fluid pressure overcomes the supply fluid pressure and the valve mechanism 18 is closed (See FIG. 3B). When the pressure of the fluid in the low-pressure flow line 16 drops back below the max pressure desirable, the supply pressure fluid will then be greater than the pressure of the sample fluid and the spring 24 combined. The piston head 21 in the cylinder will then move back in the other direction and the valve mechanism 18 will open back up (See FIG. 3A). The pressure of the supply fluid is high enough that it can drive the piston head 21 in a valve open direction and be high enough that it can force the fluid on the top side 44 of the piston head 21 back into the sample fluid line 36 (and ultimately back to the flow line 16 and any intervening valves and piping). Therefore, the sample fluid on the top side 44 of the piston head 21 is not vented from the system.

When it is desirable, the latch valve 26 can be switched to a closed position wherein the supply fluid from the supply pressure fluid line 30 will be prevented from being directed to the bottom side 40 of the cylinder. The sample fluid will then be directed to the bottom side 40 of the cylinder 20 in addition to the top side 44 of the cylinder 20. The self-regulating control valve 10 can include a T-joint 46 to direct the sample fluid to the second inlet 34 of the latch valve 26 and the top side 44 of the cylinder 20. When this occurs, the sample fluid pressure on the top side 44 and bottom side 40 of the cylinder 20 cancels each other out (i.e., a pressure equilibrium occurs across the piston head 21 in the cylinder 20) and the only force working on the valve mechanism 18 is the spring 24, which closes the flow of fluid from the high-pressure fluid supply 14 to the low-pressure flow line 16.

Figures 3A, 3B:
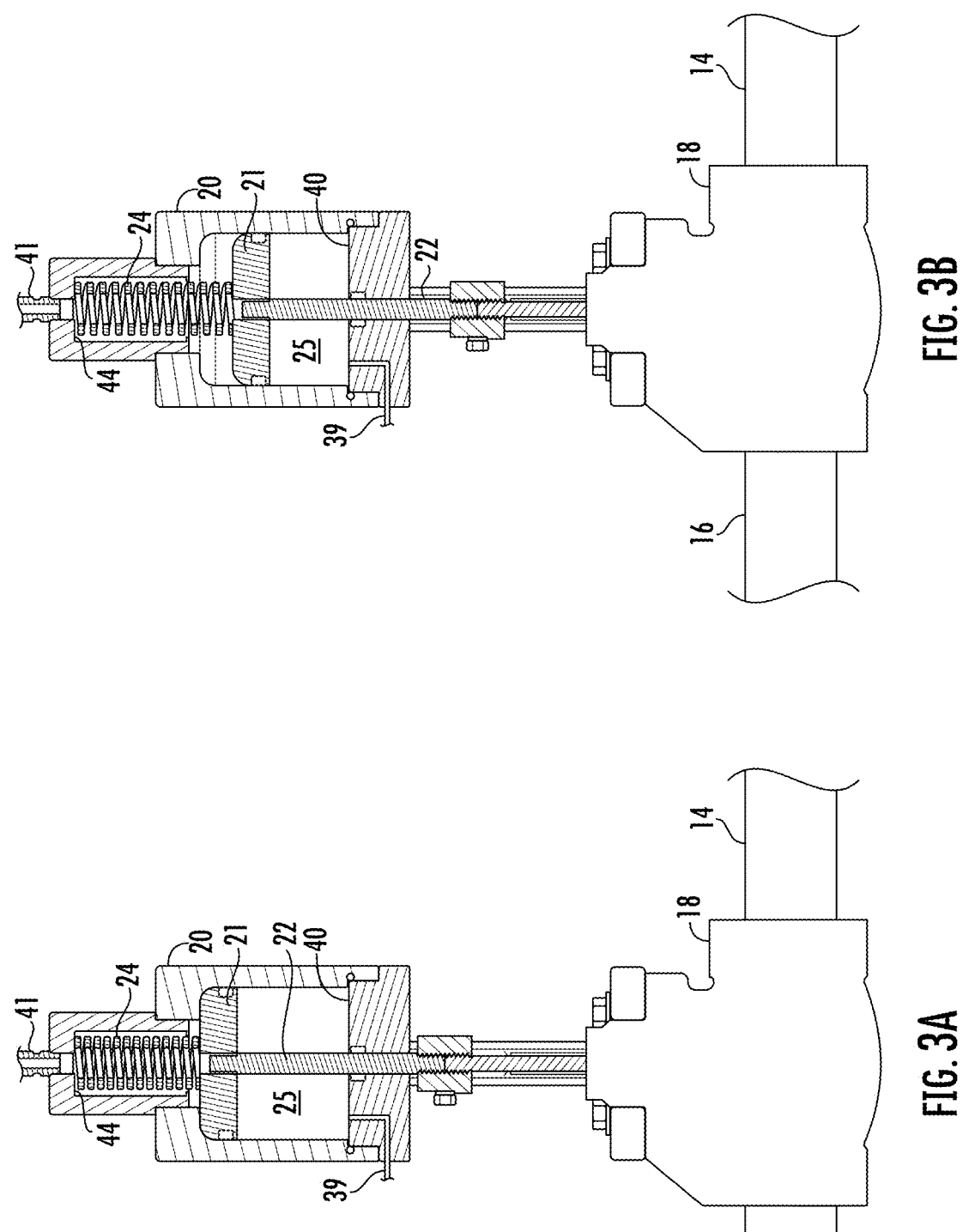
FIGS. 3A-3C are partial cross-sectional view/partial side elevation view of the self-regulating control valve constructed in accordance with the present disclosure.
Figure 3C:
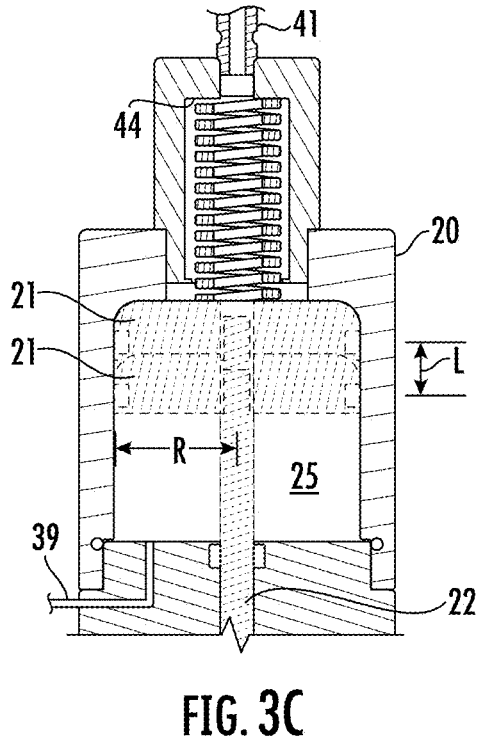

Referring now to FIG. 3C, the self-regulating control valve 10 has a unique design so the piston head 21 can travel far enough in the cylinder 20 to permit the valve mechanism 18 to fully close (FIG. 3B) when the pressure of the fluid is equalized above and below the piston head 21. The piston head 21 has a certain travel length L between the piston head's position in the cylinder 20 when self-regulating control valve 10 is in a fully open position and when the self-regulating control valve 10 is in a fully closed position. The piston head 21 for any given self-regulating control valve 10 has a certain radius R. The length L the piston head 21 can travel in the cylinder 20 and the radius R of the piston head 21 corresponds to a certain volume (piston head travel volume) of fluid in the cylinder 20 that the piston head 21 displaces when moving between the fully open position and the fully closed position and vice versa.

In one embodiment, the cylinder 20 is designed such that a closed side 25 of the cylinder 20 (i.e., the side of the cylinder 20 between the piston head 21 at its fully closed position and the bottom side 40 of the cylinder 20) corresponds to a certain volume. The volume of the closed side 25 of the cylinder 20 can be a certain amount larger than the piston head travel volume such that the spring 24 can fully close the valve mechanism 18. In one embodiment, the volume of the closed side 25 can include the volume back to the regulator 42 (the volume of the fluid in the latch valve 26 that is in fluid communication with the cylinder 20 and the regulator 42). The volume of the closed side 25 of the cylinder 20 being larger than the volume of the piston head travel volume permits the piston head 21 to travel the required distance to expel all fluid from the piston head travel volume and fully close the valve mechanism 18. This extra volume allows for the fluid on the closed side 25 to be compressed, which increases the pressure of the fluid on the closed side 25, but not beyond the force pressure from the spring 24 thereby permitting the spring 24 to close the valve mechanism 18. In one embodiment, the volume of the closed side 25 of the cylinder 20 is greater than about 1.5 times larger than the piston head travel volume. In another embodiment, the volume of the closed side 25 of the cylinder 20 is greater than about 2.0 times larger than the piston head travel volume. In yet another embodiment, the volume of the closed side 25 of the cylinder 20 is greater than about 3 times larger than the piston head travel volume. In an even further embodiment, the volume of the closed side 25 of the cylinder 20 is greater than about 4 times larger than the piston head travel volume.

In one embodiment, the self-regulating control valve 10 can have a surplus container (not shown) in fluid communication with the closed side 25 of the cylinder 20 (or closed side 25 of the cylinder 20) to provide a space for the fluid on the bottom side of the piston head 21 of the cylinder 20 to move to when the piston head 21 travels the total necessary length so that the valve mechanism 18 can fully close. In another embodiment, the surplus container 48 of the self-regulating control valve 10 can be designed to be a certain amount larger than the piston head travel volume of the piston head 21 in the cylinder 20 so that the fluid/air on the bottom side 40 of the cylinder 20 does not prevent full closure of the valve mechanism 18.

Figure 4:
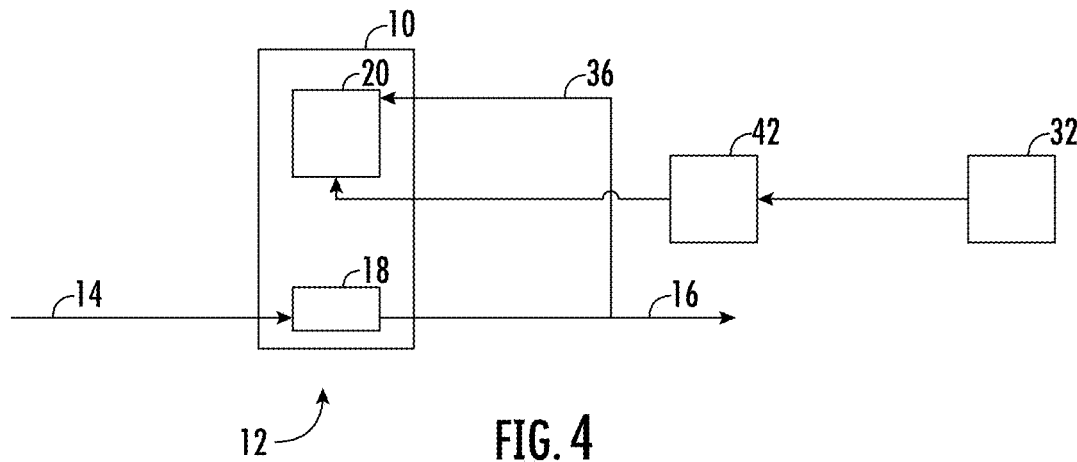
FIG. 4 is a schematic view of one embodiment of a system using another embodiment of a self-regulating control valve constructed in accordance with the present disclosure.
Figure 5:
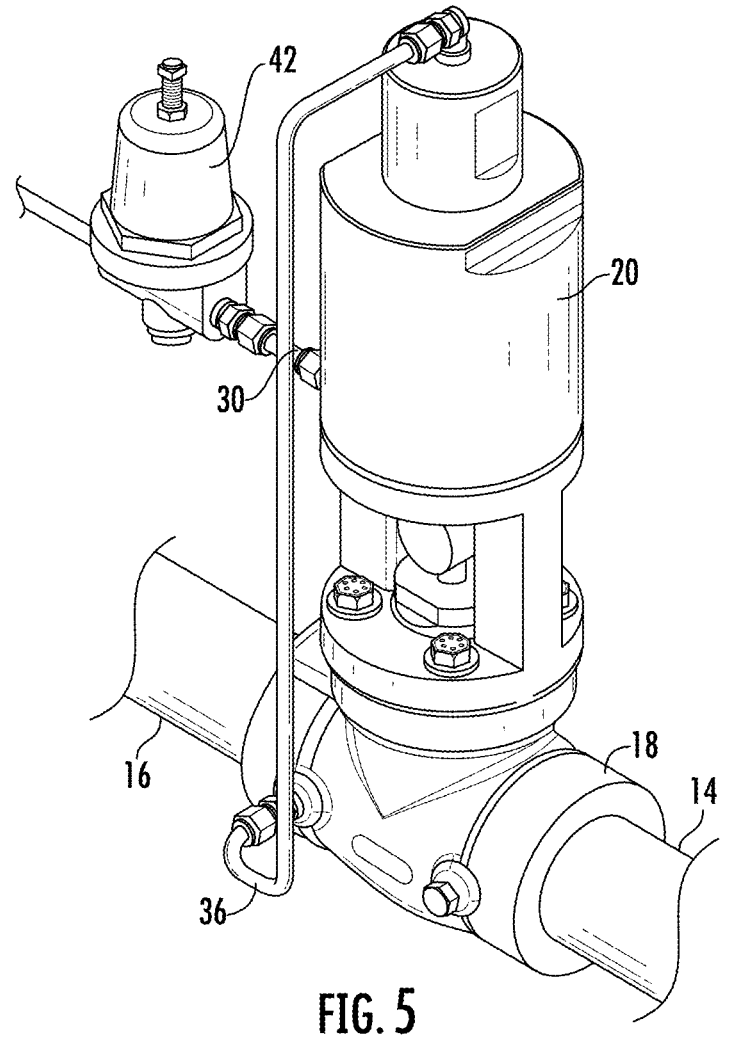
FIG. 5 is a perspective view of another embodiment of a self-regulating control valve constructed in accordance with the present disclosure.
Figure 6:
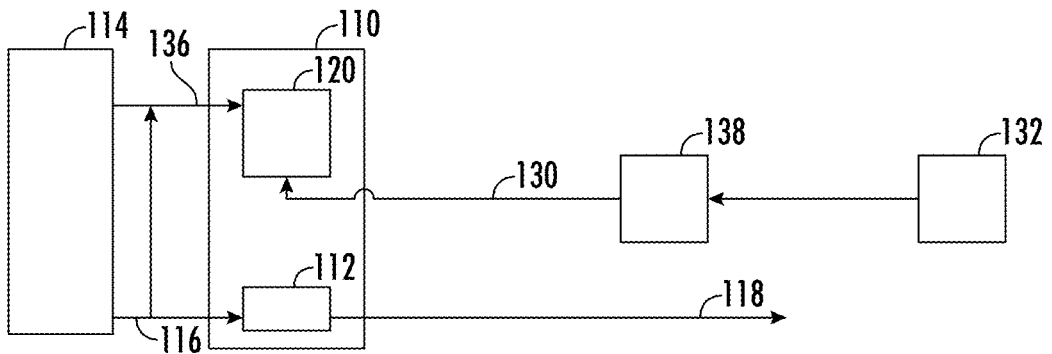
FIG. 6 is a schematic view of another embodiment of a system using a self-regulating control valve constructed in accordance with the present disclosure.
Figure 7:
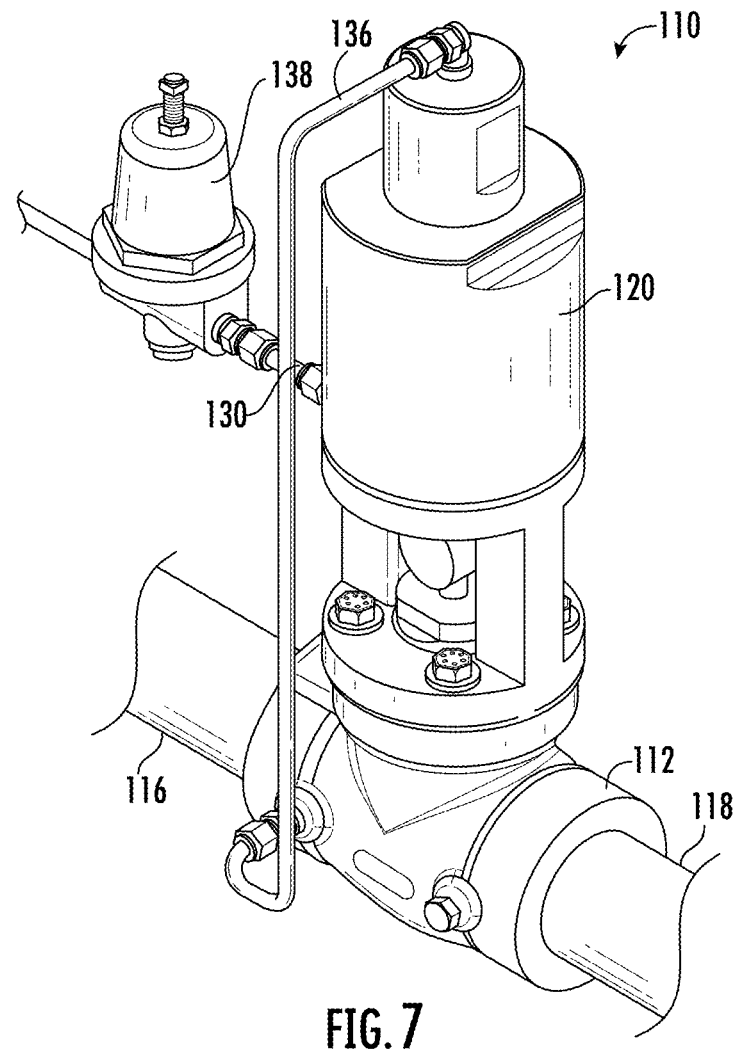
FIG. 7 is a perspective view of the self-regulating control valve of FIG. 6 and constructed in accordance with the present disclosure.
Figure 8:
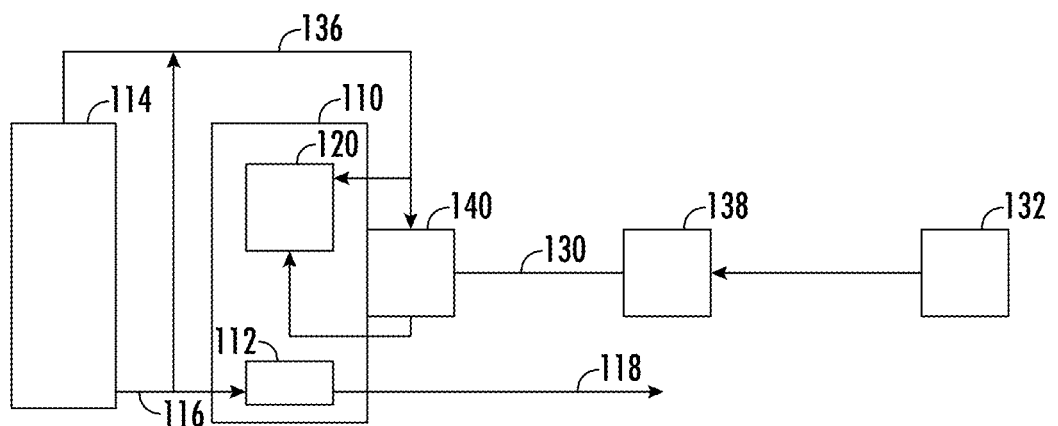
FIG. 8 is a schematic view of a system using yet another embodiment of a self-regulating control valve constructed in accordance with the present disclosure.
Figure 9:
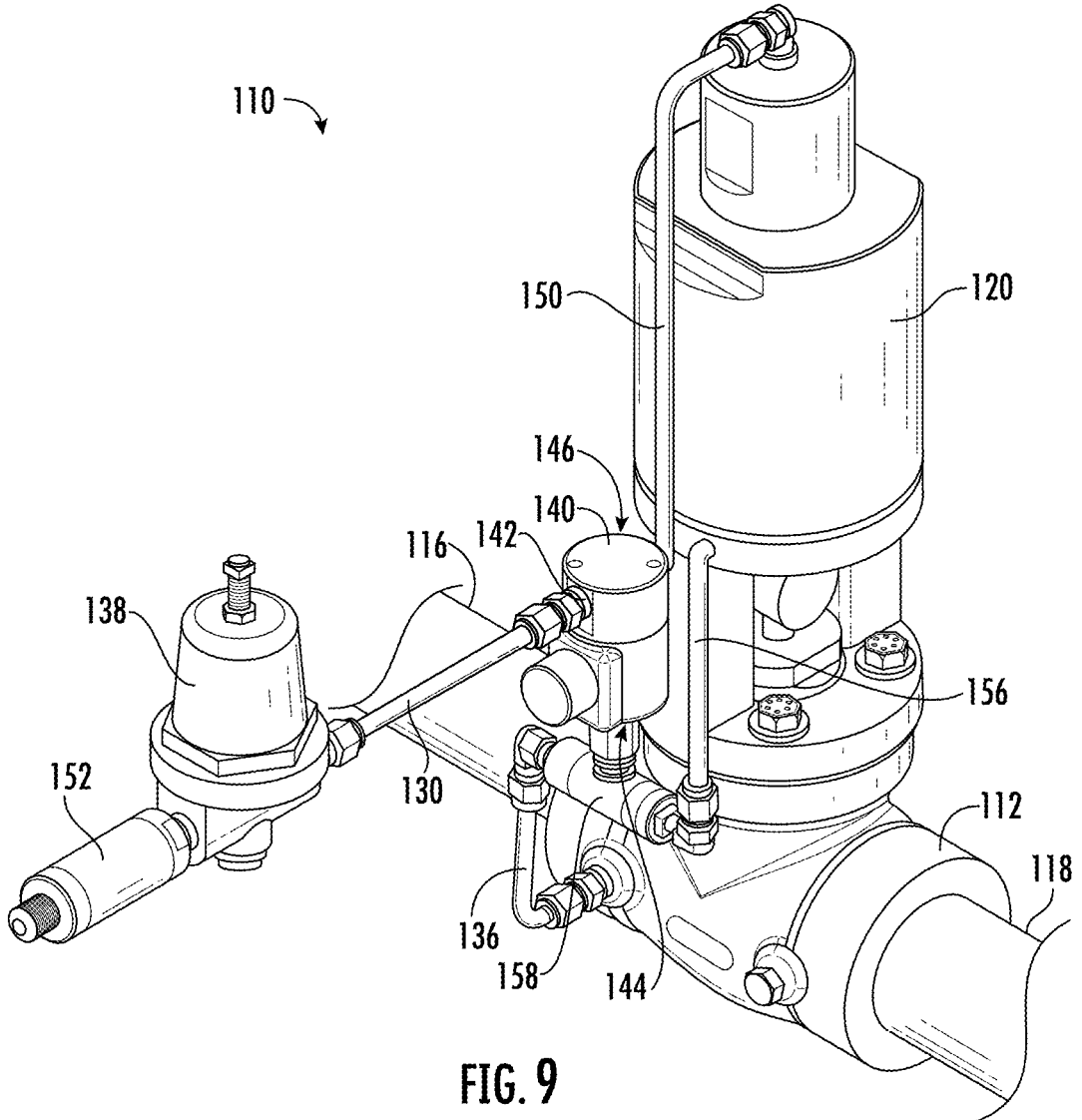
FIG. 9 is a perspective view of the self-regulating control valve in FIG. 8 and constructed in accordance with the present disclosure.

In another embodiment of the present disclosure shown in FIGS. 4 and 5, the self-regulating control valve 10 is set up without the use of a latch valve. In this embodiment, the supply pressure fluid 30 can be directed, by way of the regulator 42, to the closed side 25 of the cylinder 20 of the self-regulating control valve 10 to force the piston head 21 in the direction to open the valve mechanism 18. Simultaneously, the sample fluid line 36 can be directed to an open side 27 of the cylinder 20 to provide force to the piston head 21 to force the piston head 21 in the direction to close the valve mechanism 18. The closed side 25 of the cylinder 20 is the side of the cylinder 20 that the piston head 21 travels toward to close the valve mechanism 18. Conversely, the open side 27 of the cylinder 20 is the side of the cylinder 20 that the piston head 21 travels toward to open the valve mechanism 18.

In this embodiment, the supply pressure fluid 30 is fed to the closed side 25 of the cylinder at a pressure that is roughly equal to the desired maximum pressure of the low-pressure flow line 16. The pressure of the supply pressure fluid 30 by the pressure regulator 42 to be roughly equal to the maximum desired pressure of the low-pressure flow line 15. This maintains the position of the piston head 21 in the cylinder 20 to keep the valve mechanism 18 open. The sample fluid line 36 delivers fluid from the low-pressure flow line 16 to the open side 27 of the to force the piston head 21 in a direction that would close the valve mechanism 18 if the pressure of the fluid in the sample fluid line 36 exceeds the desired maximum pressure in the low-pressure flow line 16. Thus, when the pressure of the fluid in the sample fluid line 36 exceeds the pressure of the supply pressure fluid 30, the piston head 21 is forced in a direction in the cylinder 20 to close the valve mechanism 18. When the pressure of the fluid in the sample fluid line 36, and thus the low-pressure flow line 16, the pressure of the fluid on the closed side 25 of the cylinder becomes greater than the pressure of the fluid on the open side 27 of the cylinder 20, which opens the valve mechanism 18.

The embodiment shown in FIGS. 4 and 5 was described without the use of a spring with the self-regulating control valve 10. In an alternative embodiment, the self-regulating control valve 10 can include a spring 24. If a spring 24 is used, it would be installed in the cylinder 20 and apply closing force to the piston head 21. When the spring 24 is used in the self-regulating control valve 10, the pressure of the supply pressure fluid 30 is set to be roughly equal to the spring force pressure and the maximum desired pressure of the pressure of the fluid from the sample fluid line 36 (i.e., the pressure of the fluid in the low-pressure flow line 16). Therefore, when the pressure of the fluid in the low-pressure flow line 16 rises above the desired maximum pressure, the pressure of the fluid from the sample fluid line 36 and the spring 24 cooperate to close the valve mechanism 18 by acting on the piston head 21 in the cylinder 20. When the pressure in the low-pressure flow line 16 falls below the maximum pressure desired for the fluid therein, the pressure of the supply pressure fluid 30 opens the valve mechanism 18 to permit fluid to flow from the high pressure fluid supply 14 to the low-pressure flow line 16.

In yet another embodiment of the present disclosure, shown in more detail in FIGS. 6-10C, a self-regulating control valve 110 is shown that is used as a back pressure valve to open a valve mechanism 112 to relieve pressure from a pressurized system 114 when the pressure of the fluid in the pressurized system 114 rises above a certain desired threshold. The pressurized system 114 can be any type of system where the pressure of the system has a desired maximum pressure for the fluid in the system. The pressurized system 114 could be piping or an apparatus. A pressure relief line 116 could be used to fluidically connect the pressurized system 114 to the valve mechanism 112 of the self-regulating control valve 110. A vent line 118 could carry the fluid from the pressure relief line 116 when the valve mechanism 112 is opened. The vent line 118 can deliver the fluid removed from the pressurized system 114 to any system or apparatus desired.

To operate the valve mechanism 112, the self-regulating control valve 110 can include a cylinder 120 having a piston head 122 slidably disposed within the cylinder 120 and a spring 124 for forcing the piston head 122 in a direction that closes the valve mechanism 112. The piston head 122 can be operationally connected to the valve mechanism 112 via a valve stem 126. The opening side 128 of the cylinder 120 (i.e., the side of the cylinder 120 where pressure is provided to open the valve mechanism 112) can receive a supply pressure fluid via a supply pressure line 130 to contribute to operation of the self-regulating control valve 110. The supply pressure fluid can be provided by regulating a pressurized gas source 132 to a desired supply pressure for operation of the self-regulating control valve 110. In an exemplary embodiment, the pressurized gas source for the pressurized gas can be the gas from the casing of an oil and gas well. In addition to the bottom side 128, the cylinder 120 can also include a closing side 134 (i.e., the side of the cylinder 120 where pressure is provided to close the valve mechanism 112) for receiving a sample fluid via a sample fluid line 136 directed from the pressurized system 114. The sample fluid line 136 can be fed directly to the cylinder 120 from the pressurized system 114 or from the pressure relief line 116.

The spring 124 is designed to provide a specific amount of closing pressure on the piston head 122 in the cylinder 120. A regulator 138 can be used to maintain the pressure of the fluid in the supply pressure line 130 at a specific pressure. The combination of the pressure of the fluid in the supply pressure line 130 and the closing pressure of the spring 124 should roughly be equal to the maximum desired pressure of the fluid in the pressurized system 114. Therefore, when the pressure of the fluid in the pressurized system 114 is below the maximum desired pressure for the pressurized system 114, the valve mechanism 112 remains closed because the pressure of the fluid in the supply pressure line 130 and the spring force pressure is greater than the pressure of the fluid in the pressurized system 114. However, when the pressure of the fluid in the pressurized system 114 rises above the maximum pressure desired for the pressurized system 114, the valve mechanism 112 is opened because the pressure of the fluid in the pressurized system 114 is greater than the pressure from the supply pressure line 130 and the spring force pressure, which permits fluid to flow from the pressurized system 114 to reduce the pressure therein. When the pressure of the fluid in the pressure relief line 116, and thus the pressurized system 114, falls back below the maximum desired pressure, the valve mechanism 112 will close.

In another embodiment, the self-regulating control valve 110 could be operated without the spring 124. In this embodiment, the pressure of the fluid in the supply pressure line 130 would be roughly equal to the maximum desired pressure of the pressurized system 114. Therefore, when the pressure of the fluid in the pressurized system 114 rises above the desired maximum pressure thereof, the valve mechanism 112 will be opened and the fluid will be permitted to flow to the vent line 118. When the pressure of the fluid in the pressurized system 114 falls back below the maximum desired pressure thereof, the pressure of the fluid from the supply pressure line 130 acts on the piston head 122 to close the valve mechanism 112.

In another embodiment shown in more detail in FIGS. 8-10C, the self-regulating control valve 110 can also incorporate a latch valve 140 to control the flow of various fluids to properly operate the self-regulating control valve 110. As an exemplary embodiment, the latch valve 140 could be a 3/2 solenoid valve. The latch valve 140 can include a first inlet 142 for receiving a supply pressure fluid from a supply pressure fluid line 130 to contribute to operation of the self-regulating control valve 110. The supply pressure fluid 30 can be provided by regulating a pressurized gas source 132 to a desired supply pressure for operation of the self-regulating control valve 110. In an exemplary embodiment, the pressurized gas source 132 for the pressurized gas can be the gas from the casing of an oil and gas well. In addition to the first inlet 142, the latch valve 140 can include a second inlet 144 for receiving a sample fluid via a sample fluid line 136 directed from the pressure relief line 116 (or the pressurized system 114) and an outlet 146 for directing the supply pressure fluid to a bottom side 148 of the cylinder 120 via flow line 150. The bottom side 148 of the cylinder 120 is the side that opens the valve mechanism 112 when the requisite amount of force is applied.

When the latch valve 140 is in an open position, the supply pressure fluid maintained at a desired supply pressure by a regulator 138 is fed to the first inlet 142 and exits the outlet 146 and is directed to a top side 154 of the cylinder 120 via the flow line 150. A check valve 152 could be incorporated upstream from the regulator 138 to prevent fluid from the self-regulating control valve 110 from flowing back towards the pressurized gas source 132. The sample fluid from the pressure relief line 116 or the pressurized system 114 is directed to the second inlet 144 of the latch valve 140 and the bottom side 148 of the cylinder 120. Therefore, when the latch valve 140 is in the open position the supply pressure fluid is acting on the top side of the piston head 122 in the cylinder 120 in a valve close direction for the valve mechanism 112. At the same time, the sample fluid from the pressure relief line 116 (i.e., has the same pressure as the fluid from the pressurized system 114) is directed to the bottom side 148 of the cylinder 20, via flow line 156, in a valve open direction for the valve mechanism 112. The spring 124 is also acting in the valve close direction on the valve mechanism 112. To open the valve mechanism 112 and protect the pressurized system 114 upstream from the self-regulating control valve 110, the pressure of the sample fluid from the pressure relief line 116 (or the pressurized system 114) has to be greater than the pressure of the supply pressure fluid from the supply pressure relief line 130 and the force of the spring 124. The pressure of the supply pressure fluid can be set to be roughly equal to the max pressure desirable for the pressurized system 114 minus the force of the spring 124. When the pressure of the fluid in the pressure relief flow line 116 (or the pressurized system 114) gets above the max pressure desirable (the pressure of the sample fluid line 136 is also above the max pressure), the combination of the spring pressure and the sample fluid pressure is overcome by the supply fluid pressure in the sample fluid line and the valve mechanism 112 is opened (See FIG. 10B). When the pressure of the fluid in the pressure relief flow line 116 or the pressurized system 114 (i.e., the pressure of the fluid in the sample fluid line 136) drops back below the max pressure desirable for the pressurized system 114, the supply pressure fluid and the force of the spring 124 will then be less than the pressure of the sample fluid. The piston head 122 in the cylinder 120 will then move back in the other direction and the valve mechanism 112 will close (See FIG. 10A).

When it is desirable, the latch valve 140 can be switched to a closed position wherein the supply fluid from the supply pressure fluid line 130 will be prevented from being directed to the top side 154 of the cylinder 120. The sample fluid will then be directed to the top side 154 of the cylinder 120 in addition to the bottom side 148 of the cylinder 120. The self-regulating control valve 110 can include a T-joint 158 to direct the sample fluid to the second inlet 144 of the latch valve 140 and the bottom side 148 of the cylinder 120. When this occurs, the sample fluid pressure on the top side 154 and bottom side 148 of the cylinder 120 cancels each other out and the only force working on the valve mechanism 112 is the spring 124, which closes the flow of fluid from the pressurized system 114 to the vent line 118.

Figure 10C:
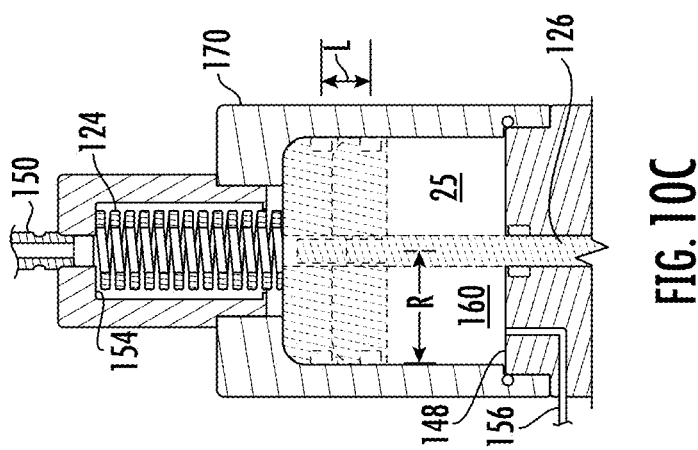
FIGS. 10A-10C are partial cross-sectional view/partial side elevation view of the self-regulating control valve of FIG. 9 and constructed in accordance with the present disclosure.
Figure 10B:
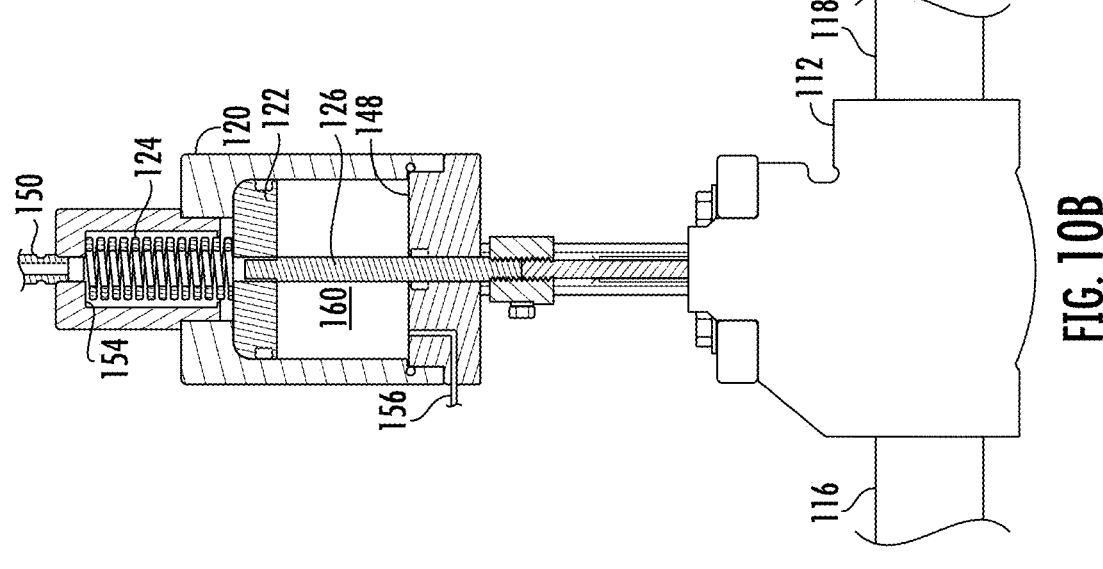
Figure 10A:
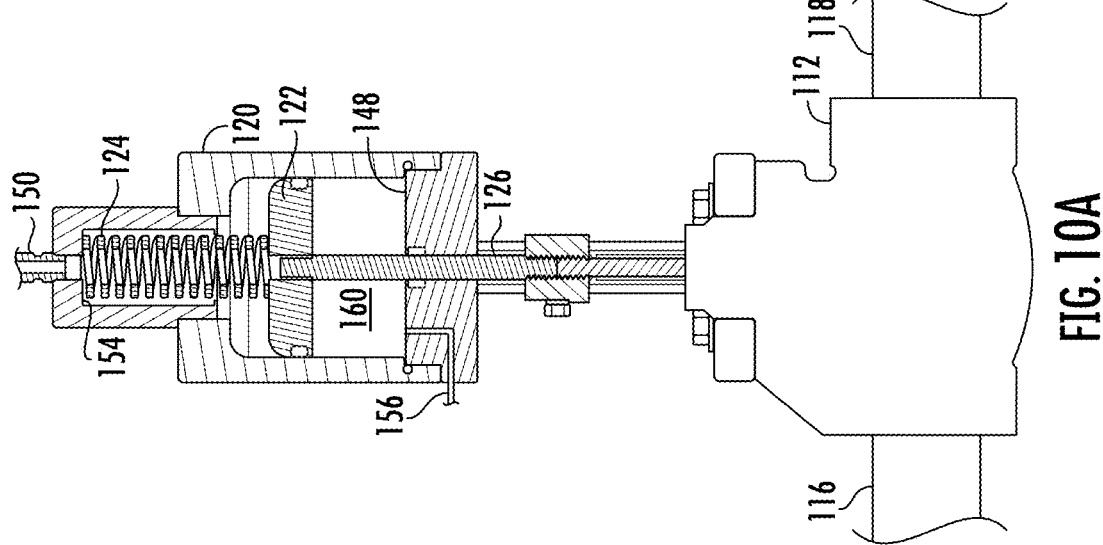

Similar to the self-regulating control valve 10 described herein, the self-regulating control valve 110 incorporates a cylinder 120 that has a unique design so the piston head 122 can travel far enough in the cylinder 120 to permit the valve mechanism 112 to fully open when the pressure of the fluid is equalized above and below the piston head 122. Referring not to FIG. 10C, the piston head 122 has a certain travel length L between the piston head's position in the cylinder 120 when self-regulating control valve 110 is in a fully open position and when the self-regulating control valve 110 is in a fully closed position. The piston head 122 for any given self-regulating control valve 110 has a certain radius R. The length L the piston head 122 can travel in the cylinder 120 and the radius R of the piston head 122 corresponds to a certain volume (piston head travel volume) of fluid in the cylinder 120 that the piston head 122 displaces when moving between the fully closed position and the fully open position and vice versa. In one embodiment, the cylinder 120 is designed such that a closed side 160 of the cylinder 120 (i.e., from the position of a closed side of the piston head 122 at its fully closed position to the side of the cylinder 120 the piston head 122 travels toward when the self-regulating control valve 110 is in the closed position). The closed side 160 of the cylinder 120 corresponds to a certain volume. The volume of the closed side 160 of the cylinder 120 can be a certain amount larger than the piston head travel volume such that the spring 124 can fully close the valve mechanism 112 without the pressure of the fluid on the closed side 16 increasing above the spring force and the pressure of the fluid from the supply pressure line 136. The volume of the closed side 160 of the cylinder 120 being larger than the volume of the piston head travel volume permits the piston head 122 to travel the required distance to expel all fluid from the piston head travel volume and fully close the valve mechanism 112. In one embodiment, the volume of the closed side 160 of the cylinder 120 is greater than about 1.5 times larger than the piston head travel volume. In another embodiment, the volume of the closed side 160 of the cylinder 120 is greater than about 2.0 times larger than the piston head travel volume. In yet another embodiment, the volume of the closed side 160 of the cylinder 120 is greater than about 3 times larger than the piston head travel volume. In an even further embodiment, the volume of the closed side 160 of the cylinder 120 is greater than about 4 times larger than the piston head travel volume.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A self-regulating control valve, the valve comprising:
   a valve mechanism for controlling the flow of fluid from a high-pressure fluid supply to a low-pressure flow line, the low-pressure flow line having a max pressure for fluid flowing therethrough;
   a cylinder with a piston head therein;
   a spring acting to force the piston head in a close direction, the spring having a pressure force;
   a sample fluid line directing a sample fluid from the low-pressure flow line to a top side of the cylinder, the sample fluid acting on the piston head in a close direction for the valve mechanism;
   a supply pressure fluid acting on the piston head in an open direction for the valve mechanism;
   a latch valve to direct the supply pressure fluid to a first side of the cylinder and direct the sample fluid to a second side of the cylinder when the latch valve is an open position, the latch valve directs the sample fluid to the first side and second side of the cylinder to equalize pressure above and below the piston head when the latch valve is in a closed position; and
   wherein the max pressure for the fluid through the low-pressure flow line is approximately equal to the pressure of the supply pressure fluid and the pressure force of the spring.

2. The control valve of claim 1 further comprising a regulator to control the pressure of the supply pressure fluid.

3. The control valve of claim 1 wherein the max pressure of the low-pressure flow line is greater than about 40 psi and the pressure of the supply pressure fluid is greater than about 40 psi more than the pressure force of the spring.

4. The control valve of claim 1 wherein the max pressure of the low-pressure flow line is greater than about 100 psi and the pressure of the supply pressure fluid is greater than about 100 psi more than the pressure force of the spring.

5. The control valve of claim 1 wherein the volume of a closed side of the piston head is larger than a piston head travel volume.

6. The control valve of claim 5 wherein the volume of the closed side of the piston head is great than about 1.5 times the volume of the piston head travel volume.

7. The control valve of claim 5 wherein the volume of the closed side of the piston head is within the cylinder.

8. A self-regulating control valve, the valve comprising:
   a valve mechanism for controlling the flow of fluid from a high-pressure fluid supply to a low-pressure flow line, the low-pressure flow line having a max pressure for fluid flowing therethrough;
   a cylinder with a piston head therein;
   a spring acting to force the piston head in a close direction, the spring having a pressure force;
   a sample fluid line directing a sample fluid from the low-pressure flow line to a top side of the cylinder, the sample fluid acting on the piston head in a close direction for the valve mechanism;
   a supply pressure fluid acting on the piston head in an open direction for the valve mechanism;
   wherein the volume of a closed side of the piston head is larger than a piston head travel volume; and
   wherein the max pressure for the fluid through the low-pressure flow line is approximately equal to the pressure of the supply pressure fluid and the pressure force of the spring.

9. The control valve of claim 8 further comprising a regulator to control the pressure of the supply pressure fluid.

10. The control valve of claim 8 wherein the max pressure of the low-pressure flow line is greater than about 40 psi and the pressure of the supply pressure fluid is greater than about 40 psi more than the pressure force of the spring.

11. The control valve of claim 8 wherein the volume of the closed side of the piston head is great than about 1.5 times the volume of the piston head travel volume.

12. The control valve of claim 8 wherein the volume of the closed side of the piston head is within the cylinder.

13. A method of regulating the pressure of a low-pressure fluid line, the method comprising:
   feeding a self-regulating control valve a supply pressure fluid at a desired pressure in a direction to open a valve mechanism that controls the flow of fluid from a high-pressure fluid supply to the low-pressure flow line, the low-pressure flow line having a max pressure for fluid flowing therethrough, the self-regulating control valve comprising:
   a cylinder with a piston head therein;
   a spring acting to force the piston head in a close direction, the spring having a pressure force;
   a sample fluid line directing a sample fluid from the low-pressure flow line to a top side of the cylinder, the sample fluid acting on the piston head in a close direction for the valve mechanism;
   a supply pressure fluid acting on the piston head in an open direction for the valve mechanism; and
   wherein the max pressure for the fluid through the low-pressure flow line is approximately equal to the pressure of the supply pressure fluid and the pressure force of the spring;

feeding the self-regulating control valve the sample fluid from the low-pressure flow line in a direction to close the valve mechanism;

closing the valve mechanism of the self-regulating control valve when pressure of fluid in the low-pressure fluid line reaches the max pressure; and forcing the piston head into equilibrium by directing the sample fluid on both sides of the piston head wherein the spring closes the valve mechanism.

14. The method of claim 13 further comprising a regulator to control the pressure of the supply pressure fluid.

15. The method of claim 13 further comprising a latch valve to direct the supply pressure fluid to a bottom side of the cylinder and direct the sample fluid to the top side of the cylinder when the latch valve is in an open position.

16. The method of claim 15 wherein the latch valve directs the sample fluid to the top side and bottom side of the cylinder to equalize pressure above and below the piston head when the latch valve is in a closed position.

17. The method of claim 13 wherein the max pressure of the low-pressure flow line is greater than about 40 psi and the pressure of the supply pressure fluid is greater than about 40 psi more than the pressure force of the spring.

18. The method of claim 13 wherein the volume of a closed side of the piston head is larger than a piston head travel volume.

19. The method of claim 18 wherein the volume of the closed side of the piston head is great than about 1.5 times the volume of the piston head travel volume.

20. The method of claim 18 wherein the volume of the closed side of the piston head is within the cylinder.

21. A method of regulating the pressure of a low-pressure fluid line, the method comprising:

feeding a self-regulating control valve a supply pressure fluid at a desired pressure in a direction to open a valve mechanism that controls the flow of fluid from a high-pressure fluid supply to the low-pressure flow line, the low-pressure flow line having a max pressure for fluid flowing therethrough, the self-regulating control valve comprising:

a cylinder with a piston head therein;

a spring acting to force the piston head in a close direction, the spring having a pressure force;

a sample fluid line directing a sample fluid from the low-pressure flow line to a top side of the cylinder, the sample fluid acting on the piston head in a close direction for the valve mechanism;

a supply pressure fluid acting on the piston head in an open direction for the valve mechanism;

wherein the volume of a closed side of the piston head is larger than a piston head travel volume; and wherein the max pressure for the fluid through the low-pressure flow line is approximately equal to the pressure of the supply pressure fluid and the pressure force of the spring;

feeding the self-regulating control valve the sample fluid from the low-pressure flow line in a direction to close the valve mechanism; and closing the valve mechanism of the self-regulating control valve when pressure of fluid in the low-pressure fluid line reaches the max pressure.

22. The method of claim 21 further comprising a regulator to control the pressure of the supply pressure fluid.

23. The method of claim 21 further comprising forcing the piston head into equilibrium by directing the sample fluid on both sides of the piston head wherein the spring closes the valve mechanism.

24. The method of claim 21 wherein the max pressure of the low-pressure flow line is greater than about 40 psi and the pressure of the supply pressure fluid is greater than about 40 psi more than the pressure force of the spring.

25. The method of claim 21 wherein the volume of the closed side of the piston head is great than about 1.5 times the volume of the piston head travel volume.

26. The method of claim 21 wherein the volume of the closed side of the piston head is within the cylinder.

* * * * *